March 7, 1961  O. S. FLOWER  2,973,917
ADJUSTABLY MOUNTED FISHING REEL
Filed April 7, 1958  2 Sheets-Sheet 1

INVENTOR.
Ora S. Fowler
BY
ATTORNEYS

INVENTOR.
Ora S. Fowler

United States Patent Office 2,973,917
Patented Mar. 7, 1961

2,973,917

ADJUSTABLY MOUNTED FISHING REEL

Ora S. Fowler, 1259 Steele St., Denver, Colo.

Filed Apr. 7, 1958, Ser. No. 726,797

2 Claims. (Cl. 242—84.2)

This invention relates to fishing reels and more particularly to "spinning reels."

Fishing techniques vary according to the size and habits of the fish sought, and also according to the waters being fished. For example, stream or inland lake fishing utilizes various types of baits or lures. If worms or similar bait is used, a baited hook is dropped or dangled in the water below the surface, usually near the bottom, and when the fisherman feels a pull on the hook he jerks the line to set the hook, i.e., force it into the fish beyond its barb in order that the fish may be landed without escaping the hook. This type of fishing involves the use of baits which are natural food for the fish being taken, and hence requires little manipulation or movement after deposit in the water.

Fly casting involves tying fly-like bodies about hooks which are fastened to lightweight lines and deposited on the surface of a stream or lake by a casting movement intended to cause the artificial fly to alight on the water in the manner of a natural fly and the fisherman manipulates the line to simulate the action of such a fly on the water. This type of fishing involves considerable manipulation in which the fly is kept in almost constant movement, necessitating considerable winding of the line on the reel.

Another type of fishing is "spin casting" or "spinning," in which artificial lures simulating the appearance and action of natural objects, such as minnows, frogs, insects and the like, are fastened on a line, thrown or cast a long distance from the fisherman and moved by a line winding action to simulate the movements in water of the object the lure represents or simulates. Such fishing involves almost continuous movement from casting to retrieve, in which skillful manipulation is beneficial or essential.

Some fishermen have trained to retrieve by holding the rod in the left hand while winding with the right, and others do so in reverse, whether right or left handed. The reels presently available on the market are made as left or right handed models, but cannot be operated both ways without demounting the handle.

The present invention represents a departure from prior practice in providing a reel mounting permitting the reel to be selectively positioned for right or left handed winding and which may be held in either such position until intentionally moved to a new position. Another feature of this invention is the provision of a reel spool providing an erratic eccentric or unsymmetrical winding action which imparts a jerky movement to the lure, increasing its effectiveness, and which also is beneficial in landing a fish by preventing a too rapid rewind action, a frequent cause of losing fish.

It is an object of my invention to provide a simple, durable and efficient reel, which by slight manipulation may be adapted for right hand or left hand winding.

Another object of this invention is to provide a simple, durable and efficient reel having a spool for imparting erratic unsymmetrical movement to the line during winding.

A further object of the invention is to provide a simple, economical and efficient spinning reel providing a novel winding action inclusive of a reverse wind action to prevent twisting of the line, and a free unwinding action when casting.

Other objects reside in novel details of construction and novel combinations and arrangements of parts, all of which will be described in the course of the following description.

The practice of my invention will be best understood by reference to the accompanying drawings in the several views of which corresponding parts bear similar reference numerals, and in which.

Figure 1:
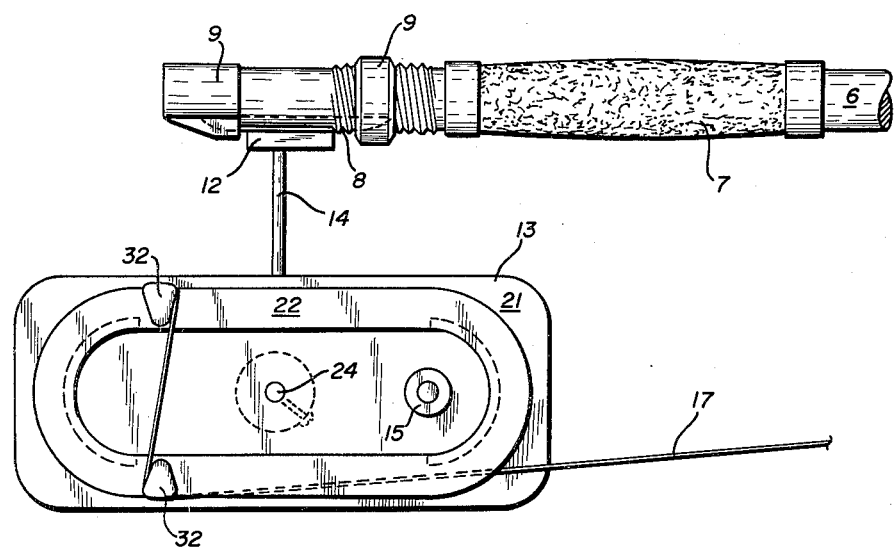
Fig. 1 is a side elevation of a reel according to the present invention mounted on a rod and shown in a winding or line-retrieving position.

As shown in Fig. 1, a rod 6 of any suitable type or composition has the usual grip or handle 7 and a seat 8, and fastenings 9 by which a base or member 12 on a reel 13 is secured to seat 8 and held during fishing operations. A rod 14 connects base 12 with reel 13, and a handle or knob 15 is mounted on reel 13 to actuate a mechanism 16 to wind a line 17 on the reel.

The reel 13 comprises a housing 20 in which the reel-winding mechanism is contained, and a spool member, inclusive of an inner plate 21, an outer plate 22 and an interconnecting or seat portion 23 on which the line 17 is wound. As shown in Fig. 1, the spool is elongated or elliptical, providing an eccentric action in winding, which imparts a jerky or erratic movement to the lure secured at an end of the line. In addition to providing a movement which excites or induces the fish to strike the lure, such action also provides a slower or erratic winding in landing a fish as compared with the usual uniform rotary action, and fewer fish are lost because of too fast a movement, as frequently occurs when conventional reels are used.

Figure 3:
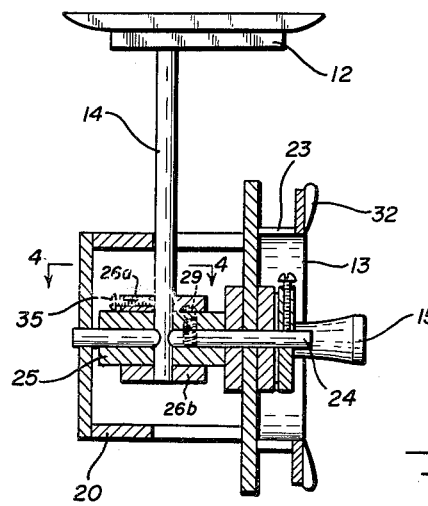
Fig. 3 is a vertical section through the reel shown in Fig. 2 and illustrating a preferred arrangement of the reel-positioning assembly.

The spool is mounted on a shaft 24, which is concentric with the axis of rotation of reel 13, and when knob 15 is grasped and manually rotated about this axis, the line 17 is wound in a retrieving action. Shaft 24 is attached to rod 14 as shown in Fig. 3, and is journaled in the outer end of housing 20. Interiorly of casing 20, the shaft 24 is encased within a block 25 with discs or bearing members 26a and 26b mounted on rod 14 and engaging block 25 on its top and bottom surfaces.

Figure 4:
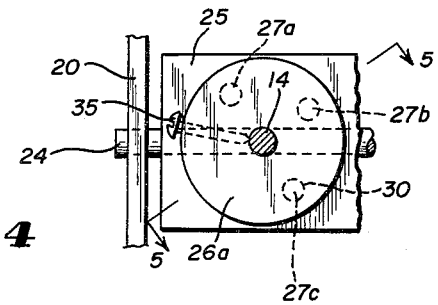
Fig. 4 is a fragmentary section along the line 4—4, Fig. 3 and drawn to an enlarged scale.
Figure 5:
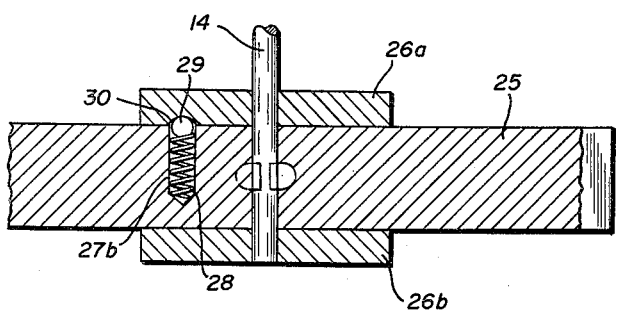
Fig. 5 is a fragmentary section along the line 5—5, Fig. 4 and drawn to an enlarged scale.

As illustrated in Figs. 3, 4 and 5, the block 25 has a plurality of bores 27a, 27b and 27c, each containing a spring 28 and ball 28, and disc 26a as a series of recesses 30 arranged to register with the bores and the spring-pressed balls act as stops to hold a given recess against movement and thereby maintain the reel in a predetermined position on the rod, until it is manually moved to a new operative position. A set screw 35 extending through an opening in disc 26a to engage rod 14 locks this assembly. The range of movement provided is 180°, which is sufficient to move knob 15 from a right hand to a left hand operative position, while the intermediate holding position maintains the reel in casting position.

Figure 6:
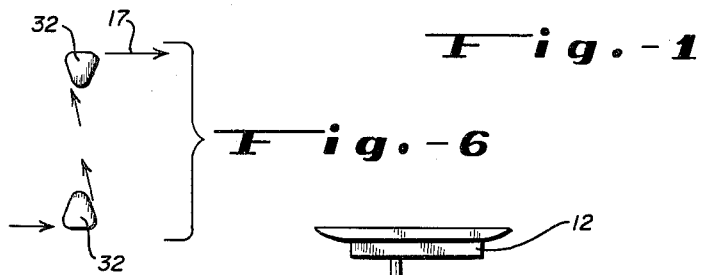
Fig. 6 is a diagrammatic representation of another line reversing procedure directed opposite to the one shown in Fig. 1.

In some operations, particularly "spin casting," the casting action or the movement of the lure in the water twists the line, and repeated windings often results in overlapping of twisted portions which prevent free movement of the line from the spool during casting. The reel of the present invention provides means for reverse winding to prevent or offset twisting tendencies. As shown in Fig. 1, one or a plurality of lugs or projections 32 are supported on plate 22 about which the line 17 may be snubbed and reverse wound on the spool. When two projections are provided, the snub winding will be an S pattern in one crossing (Fig. 6) and a reverse S in the other crossing, as shown in Fig. 1, with the takeoff on the projection opposite the one on which the snubbing is started.

When the user wishes to utilize a reverse wind, he manually moves the portion of the line approaching the spool about one of the lugs 32, then directly across the spool to pass around a side of the other lug 32 opposite to the position on the first lug and thence to the spool. Thereafter, continued winding of handle 15 in the same direction as before produces the reverse winding aforesaid and effectively prevents twisting or kinking of the line. In casting, the spool is moved ninety degrees from the winding position shown in Fig. 1 to the Fig. 2 position, and is returned to the Fig. 1 position for retrieving the line or landing a fish.

Figure 2:
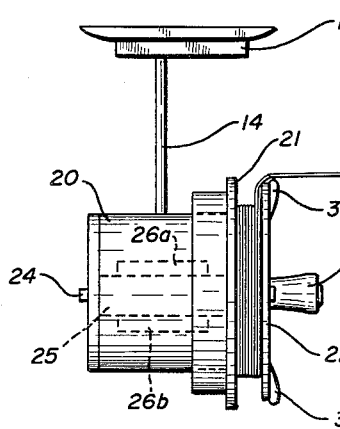
Fig. 2 is an end elevation of the reel shown in Fig. 1, and moved to a casting position.

The outer plate 22 of the reel as shown in Figs. 2 and 3 may be of uniform section throughout, or if desired, its inner peripheral edge may be rounded to facilitate line slippage in casting. However, in either form the line on the spool slackens sufficiently in the casting action so that it strips readily from the reel and pays out the lure with minimum friction until it is fingered by the fisherman to drop the lure at a desired location.

The spool in a preferred form is eccentric, or elongated so that it is substantially longer than wide, but it will be understood that other shapes may be employed in the practice of the invention to produce the erratic or jerky line movement. When it is elongated as shown in Fig. 1, the reverse winding effect will be unnecessary in most instances, as there are sufficient lengths of straight portions in each wind to substantially overcome any twisting tendencies.

The reel mounting to permit change from right to left hand positions has been illustrated in connection with the reel of the present invention, but it will be understood that such mounting will be useful in various types of reels. Similarly, the eccentric winding action of my invention may be used in reels which are only right handed or left handed types.

Other changes and modifications may be availed of within the spirit and scope of my invention as defined in the hereunto appended claims.

I claim:
1. In a fishing reel having means for its connection to a seat on a rod, a housing inclusive of a spool supported from said means, said spool comprising an inner plate portion of generally rectangular shape, an outer plate having a front surface of generally elliptical shape with the longest axis of the inner plate and the outer plate being substantially parallel and a line-receiving surface portion held between said inner and outer plates thereby forming the spool, a pivotal mounting for said spool including means for holding said spool in selective casting and winding positions, and two peripheral projections at opposite edges of the same side of the front surface of said outer plate adjacent one of its ends for crossing the fishing line over said front surface so as to reverse the direction of the winding and reduce the twist imparted to the line during casting and retrieve.

2. In a fishing reel having means for its connection to a seat on a rod, a housing inclusive of a spool supported from said means, said spool comprising a generally rectangular inner plate and a generally elliptical outer plate having a front surface, a line-receiving seat portion of such a shape as to present a generally elliptical surface upon which to wind the line being attached between the inner and outer plates, the elliptical dimensions of the line-receiving surface being less than the dimensions of the outer plate, a pivotal mounting for said spool including means for holding said spool in selective casting and winding positions, two peripheral projections at opposite edges of the same side of the front surface of the outer plate at substantially the same distance from, and adjacent one of the ends of said outer plate for crossing the fishing line over said front surface so as to reverse the direction of the winding and reduce the twist imparted to the line during casting and retrieve, said projections having a rounded outer surface to facilitate slippage of the line therefrom during casting operations.

References Cited in the file of this patent

UNITED STATES PATENTS

| | | |
|---|---|---|
| 208,500 | Altena | Oct. 1, 1878 |
| 2,397,955 | Fowler | Apr. 9, 1946 |
| 2,439,298 | Horan | Apr. 6, 1948 |
| 2,581,306 | Slotterback | Jan. 1, 1952 |
| 2,677,509 | Gage | May 4, 1954 |